(12) United States Patent
Song et al.

(10) Patent No.: US 8,748,022 B2
(45) Date of Patent: Jun. 10, 2014

(54) POUCH TYPE BATTERY

(75) Inventors: Hyojung Song, Yongin-si (KR); Daekyu Kim, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 3 days.

(21) Appl. No.: 13/587,304

(22) Filed: Aug. 16, 2012

(65) Prior Publication Data

US 2013/0202932 A1    Aug. 8, 2013

(30) Foreign Application Priority Data

Feb. 3, 2012 (KR) .......................... 10-2012-0011318

(51) Int. Cl.
  *H01M 4/00*    (2006.01)
(52) U.S. Cl.
  USPC ............. 429/94; 429/247; 156/184; 156/290; 156/291
(58) Field of Classification Search
  None
  See application file for complete search history.

(56) References Cited

U.S. PATENT DOCUMENTS 6,042,966 A * 3/2000 Cheu .............................. 429/163
  2004/0142236 A1* 7/2004 Kim et al. .................... 429/144
  2011/0008672 A1 1/2011 Kim
  2011/0244318 A1* 10/2011 Cho et al. ...................... 429/186
  2011/0287302 A1* 11/2011 Kim .............................. 429/163

FOREIGN PATENT DOCUMENTS

JP    6-150971 A    5/1994
  KR    10-2007-0096649 A    10/2007
  KR    2008-0019311 A    3/2008
  KR    10-2011-0004770    1/2011

* cited by examiner

*Primary Examiner* — Milton I Cano
*Assistant Examiner* — Carmen Lyles-Irving
(74) *Attorney, Agent, or Firm* — Lee & Morse, P.C.

(57) ABSTRACT

A pouch type battery includes an electrode assembly having a first electrode, a second electrode and a separator between the first electrode and the second electrode, the first electrode, second electrode and separator being wound together, an electrolyte, a pouch accommodating the electrode assembly and the electrolyte, and a fixing member fixing a winding end of the electrode assembly. The fixing member includes a base layer and an adhesive layer located at either side of the base layer, the fixing member making contact with external surfaces of the electrode assembly, and the base layer being a material that melts and acquires adhesiveness upon contact with the electrolyte. A portion of the base layer in contact with the electrolyte is in a melted condition and is separated from the adhesive layer.

18 Claims, 3 Drawing Sheets

POUCH TYPE BATTERY

BACKGROUND

Korean Patent Application No. 10-2012-0011318, filed on Feb. 3, 2012, in the Korean Intellectual Property Office, and entitled: "Pouch Type Battery," is incorporated by reference herein in its entirety.

1. Field

An embodiment relates to a pouch type battery.

2. Description of the Related Art

In a secondary battery, a separator between a positive electrode plate and a negative electrode plate (hereinafter, the positive electrode plate, the negative electrode plate and the separator are collectively referred to as an electrode assembly) may function not only as a separating insulator in a lithium ion battery but also as a medium of ion conduction, that is, an electrolyte. The separator may be made of, for example, a gel-type polymer electrolyte formed in a state in which an electrolyte is impregnated in a polymer to improve ionic conductivity.

Secondary batteries are manufactured in various shapes. Specifically, a pouch type battery may include the electrode assembly having the separator as an insulator disposed between the positive electrode plate and the negative electrode plate, and a thin flexible pouch that accommodates the electrode assembly. Here, the pouch may have an inner space formed by adhering its edges.

The pouch material may have a multilayered structure including a metal layer and insulating layers covering surfaces of the metal layer. The insulating layers may prevent the metal layer interposed between the insulating layers from being shorted to conductive materials inside or outside the pouch.

SUMMARY

According to embodiments, there is provided a pouch type battery including an electrode assembly having a first electrode, a second electrode and a separator between the first electrode and the second electrode, the first electrode, second electrode and separator being wound together, an electrolyte, a pouch accommodating the electrode assembly and the electrolyte, and a fixing member fixing a winding end of the electrode assembly. The fixing member includes a base layer and an adhesive layer located at at least one side of the base layer, the fixing member contacting external surfaces of the electrode assembly. A portion of the base layer in contact with the electrolyte is in a melted condition. The adhesive layer is separated from a corresponding region with the portion of the base layer.

The separated adhesive layer includes a first region and a second region separated from each other by a separation distance in a range of 0.01 mm to 0.3 mm.

The portion of the base layer in the melted condition may adhesively contact an interior surface of the pouch.

The fixing member may have a thickness in a range of 10 μm to 35 μm.

The adhesive layer may have a thickness of 2 to 16% of the overall thickness of the fixing member.

The adhesive layer may have a thickness in a range of 1 μm to 4 μm.

The base layer may include a material selected from polystyrene, oriented polystyrene, polyamide, polyacrylonitrile, polyvinyl alcohol, polycarbonate, and polyethylene vinylacetate. The base layer may be an oriented polystyrene (OPS) film.

The electrolyte may include a carbonate-based solvent. The electrolyte may include at least one selected from dimethyl carbonate (DMC), diethyl carbonate (DEC) and dipropyl carbonate (DPC).

The fixing member may surround the overall outermost surface of the electrode assembly.

The pouch may include a first pouch portion and a second pouch portion to accommodate the electrode assembly, adhering portions formed by adhering opposing edges of the first pouch portion and the second pouch portion, and a planar part connecting the opposing adhering portions.

The pouch may have a multilayered thin film structure including a metal layer that is a thin film, a first insulating layer covering one surface of the metal layer, and a second insulating layer covering another surface of the metal layer, opposite to the one surface of the metal layer.

According to an embodiment, a pouch type battery includes an electrode assembly having a first electrode, a second electrode and a separator between the first electrode and the second electrode, the first electrode, second electrode and separator being wound together, and the electrode assembly including an outermost finishing part including a winding end of the electrode assembly and an exterior surface spaced apart stepwise from the winding end, a pouch accommodating the electrode assembly, and a fixing member on the outermost finishing part and on the exterior surface between the electrode assembly and the pouch, the fixing member including a base layer and an adhesive layer, the base layer having a thickness in a range of about 10 to about 35 μm and including a material selected from selected from polystyrene, oriented polystyrene, polyamide, polyacrylonitrile, polyvinyl alcohol, polycarbonate, and polyethylene vinylacetate, and the adhesive layer having a thickness of 2 to 16% of an overall thickness of the fixing member.

The pouch type battery may further include an electrolyte, wherein a portion of the base layer in contact with the electrolyte may be in a melted condition and may adhesively contact with an interior side of the pouch, and the adhesive layer includes a first region on the outermost finishing part and a second region on the exterior surface, the first region and the second region being spaced apart by a separation distance in a range of 0.01 mm to 0.3 mm.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
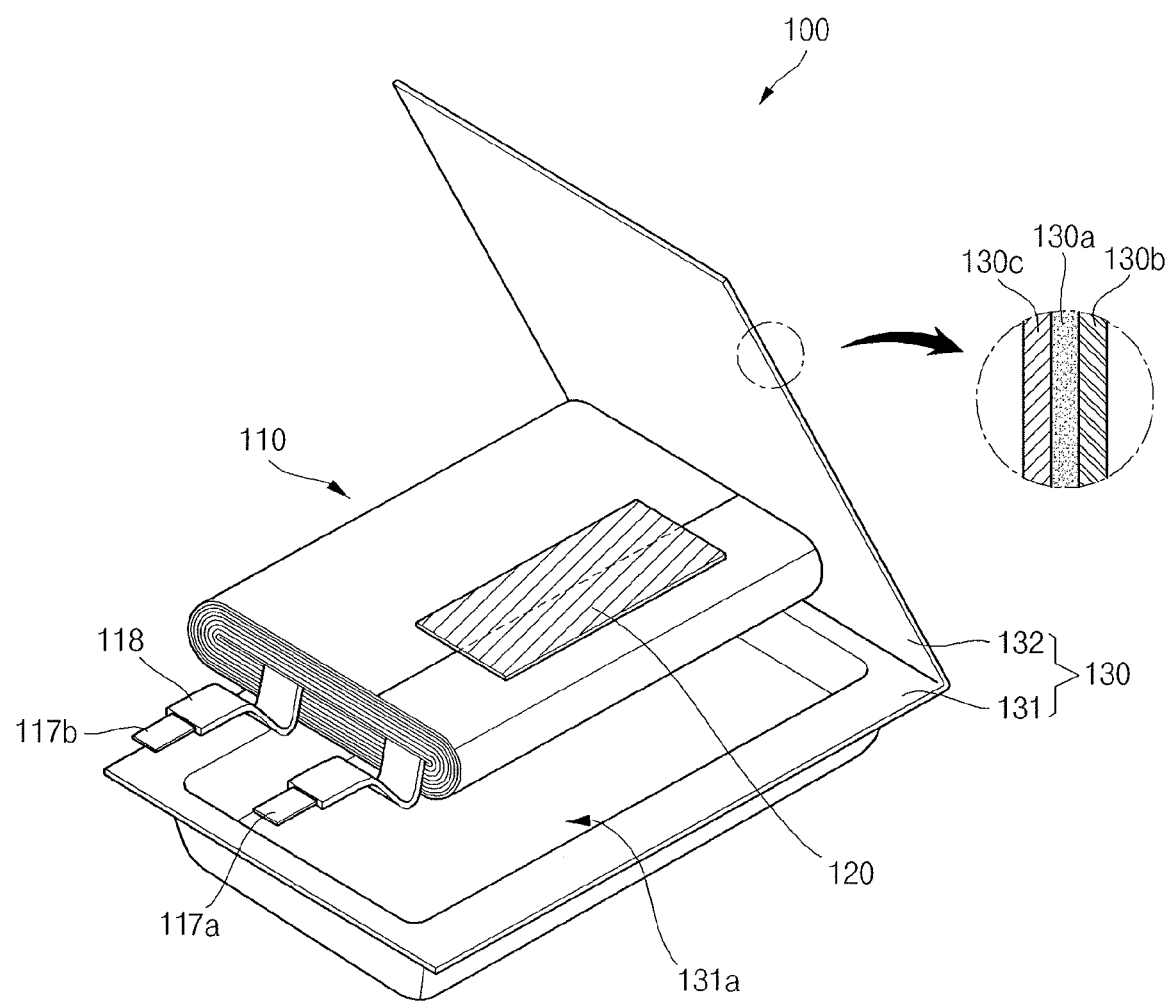
FIG. 1 illustrates an exploded perspective view of a pouch type battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, a pouch type battery and a manufacturing method thereof according to preferred embodiments will be described in detail with reference to the appended drawings.

Figure 2:
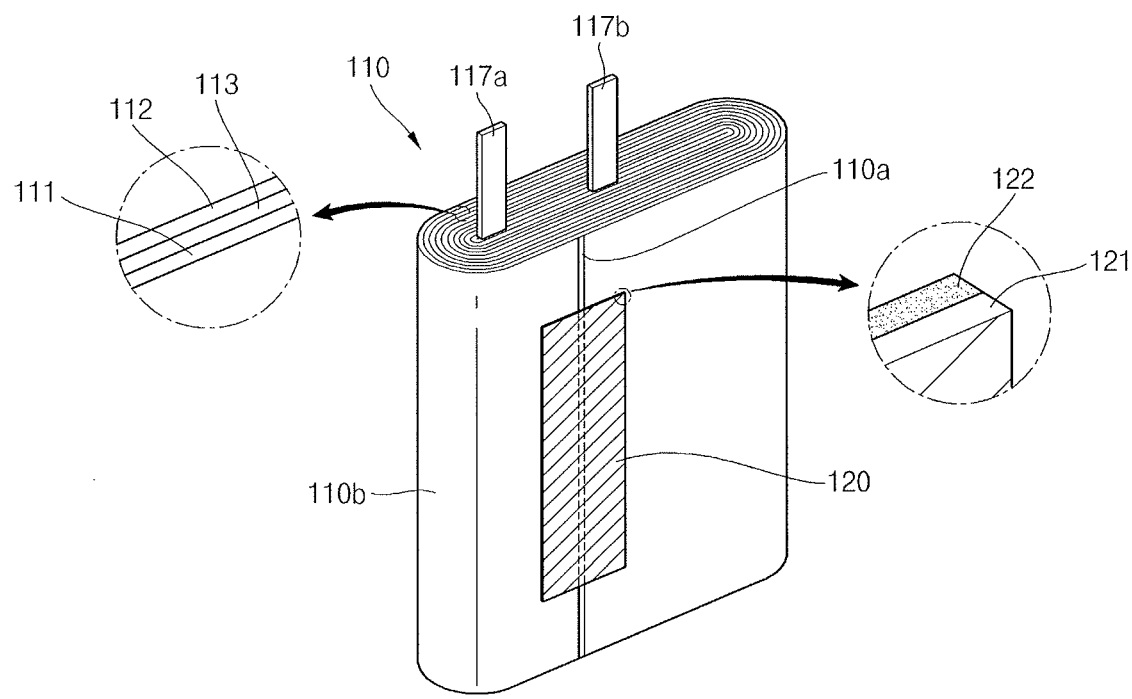
FIG. 2 illustrates a perspective view of an electrode assembly shown in FIG. 1.

FIG. 1 illustrates an exploded perspective view of a pouch type battery according to an embodiment and FIG. 2 illustrates a perspective view of an electrode assembly shown in FIG. 1.

Referring to FIGS. 1 and 2, the pouch type battery 100 according to an embodiment includes an electrode assembly 110, a fixing member 120 and a pouch 130.

The electrode assembly 110 is manufactured such that the first electrode plate 111, the separator 113 and the second electrode plate 112 are sequentially stacked and wound. The first electrode plate 111 may function as a positive electrode and the second electrode plate 112 may function as a negative electrode, or vice versa. In addition, the electrode assembly 110 may be accommodated in the pouch 130.

The first electrode plate 111 may be formed of metal foil (e.g., aluminum foil). The first electrode plate 111 may be formed by applying a first electrode active material (e.g., a transition metal oxide) on a first electrode collector. A first electrode tab 117a made of aluminum may be electrically connected to an uncoated portion of the first electrode plate 111. The first electrode tab 117a may protrude to one side of the pouch 130. The first electrode tab 117a may have thereon an insulation tape formed at a portion of the first electrode tab 117a. In other implementations, other materials may be used for the first electrode plate 111 and the first electrode tab 117a.

The second electrode plate 112 may be formed of a metal foil (e.g., a copper or nickel foil). The second electrode plate 112 may be formed by applying a second electrode active material (e.g., graphite or carbon) on a second electrode collector. A second electrode tab 117b made of aluminum may be electrically connected to an uncoated portion of the second electrode plate 112. The second electrode tab 117b may protrude to one side of the pouch 130. The second electrode tab 117b may have thereon an insulation tape formed at a portion of the second electrode tab 117b. In other implementations, other materials may be used for the second electrode plate 112 and the second electrode tab 117b.

The separator 113 may be disposed between the first electrode plate 111 and the second electrode plate 112 to reduce the possibility of and/or prevent a short circuit, and to facilitate movement of lithium ions. The separator 113 may be formed of, for example, polypropylene, polyethylene, or a composite film of polypropylene and polyethylene. In other implementations, other materials may be used for the separator 113.

The electrode assembly 110 includes an outermost finishing part 110a in which the winding end is positioned. The fixing member 120 may be positioned at a portion of an exterior surface 110b of the electrode assembly 110 and the outermost finishing part 110a. In such a case, even if a separate tape for sealing the electrode assembly 110 is not provided, the fixing member 120 may function as a tape. As a result, the fixing member 120 may prevent the electrode assembly 110 from being loosened.

The fixing member 120 is positioned between the electrode assembly 110 and the pouch 130. The fixing member 120 includes a base layer 121 having at least a portion melted when it makes contact with an electrolyte. In addition, the base layer 121 has an adhesive layer 122 formed on its rear surface.

Figure 3:
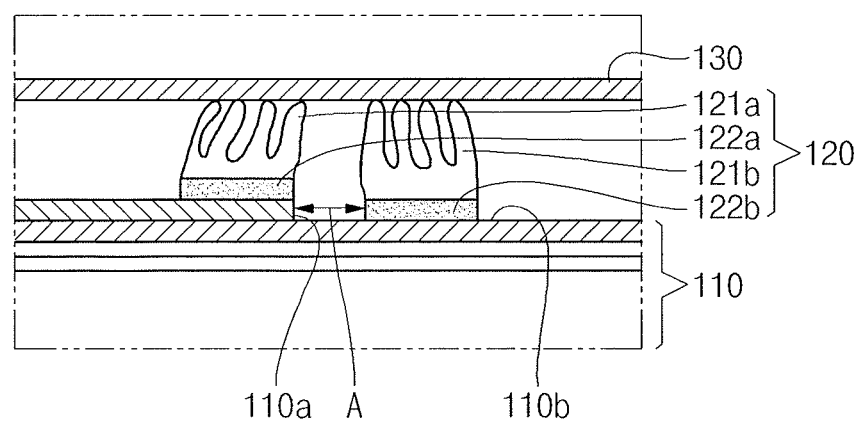
FIG. 3 illustrates a cross-sectional view schematically depicting a state in which a fixing member shown in FIG. 1 makes contact with an interior surface of a pouch after the fixing member is exposed to an electrolyte.
Figure 4:
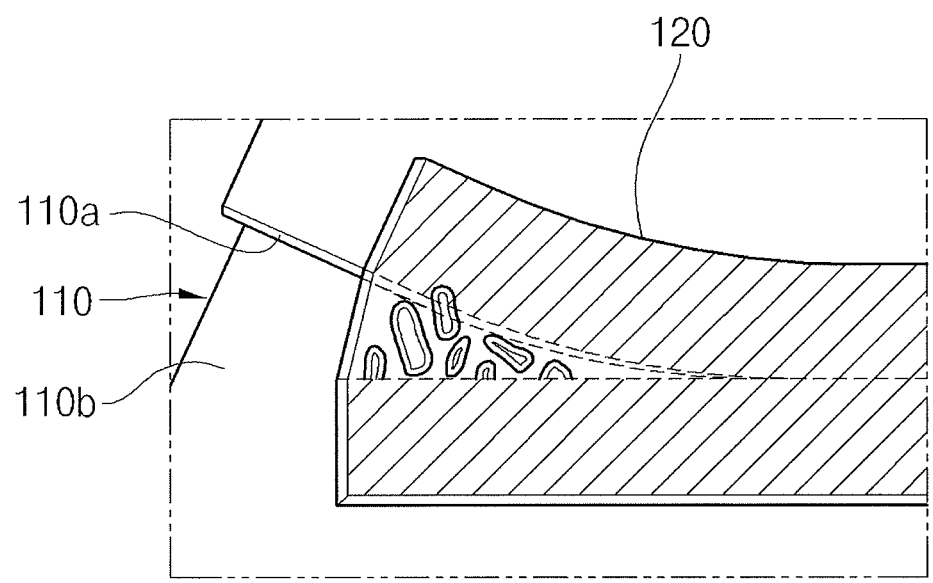
FIG. 4 illustrates an enlarged plan view schematically depicting a state in which a fixing member shown in FIG. 1 connects adhesive layers separated after the fixing member is exposed to an electrolyte.

Referring to FIGS. 3 and 4, the base layer 121 may be formed of a polymer film having at least a portion melted by making contact with electrolyte. The polymer film may be a film melted when it makes contact with the electrolyte in such a manner that at least a portion of the polymer film is melted by a carbonate solvent in the electrolyte permeating into portions between polymer molecules. For example, the polymer film may be a film formed of a material selected from polystyrene (PS), polyamide, polyacrylonitrile, polyvinyl alcohol, polycarbonate, polyethylene vinylacetate, and OPS. An oriented polystyrene (OPS) film may be used.

The base layer 121 may be formed to a thickness in a range of 10 to 35 μm, for example. If the thickness of the base layer 131 is less than 10 μm, the base layer 131 may be too easily melted upon exposure to the electrolyte. If the thickness of the base layer 131 is greater than 35 μm, the base layer 131 may not be melted by exposure to the electrolyte, thereby lowering the effect of suppressing deformation of the electrode assembly 110.

The base layer 121 includes a first base layer 121a and a second base layer 121b. The first base layer 121a is formed on a first region 122a of the adhesive layer 122 and the second base layer 121b is formed on a second region 122b of the adhesive layer 122. The first and second base layers 121a and 121b may have adhesiveness by exposure to the electrolyte to then make contact with the interior side of the pouch. In addition, the first and second base layers 121a and 121b may be connected to each other. Accordingly, it may be possible to prevent the electrode assembly 100 from being loosened.

The adhesive layer 122 may include a general adhesive without limitation. For example, the adhesive layer 122 may be formed by applying an acryl-based adhesive on the base layer 121. The acryl-based adhesive may be selected from poly methyl methacrylate (PMMA), poly ethyl methacrylate (FEMA) and poly butyl methacrylate (PBMA).

The adhesive layer 122 may be coated on the base layer 121 to various thicknesses using various suitable methods. The adhesive layer 122 may be formed by coating an adhesive to a thickness of 2 to 16% as the overall thickness of the fixing member by knife coating. For example, when the base layer 121 has a thickness of 25 μm, the adhesive layer 122 may be coated to a thickness of 1 to 4 μm.

The adhesive layer 122 has a first region 122a attached to a winding end of the electrode assembly 110 and a second region 122b attached to a portion of the exterior surface 110b of the electrode assembly 110. The adhesive layer 122 may be separated from the outermost finishing part 110a corresponding to the winding end of the electrode assembly 110. For example, the first region 122a and the second region 122b may be separated from each other by a separation distance A.

The separation distance A may be in a range of 0.01 mm to 0.3 mm. If the distance A is less than 0.01 mm, no separation may occur, that is, if the separation distance A of the adhesive layer 122 is too small, such that the adhesive layer 122 is hardly separated, the effect of suppressing deformation of the electrode assembly 100 may be lowered. In addition, if the separation distance A of the adhesive layer 122 is greater than 0.3 mm, the electrode assembly 100 may be easily loosened.

The pouch 130 may accommodate the electrode assembly 110 together with an electrolyte. The electrolyte may include a carbonate-based solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethyl carbonate (EC), propylene carbonate (PC), and butylenes carbonate (BC). Specifically, the exemplary carbonate-based solvent may include at least one of DMC, DEC and DPC. The carbonate-based solvent may easily permeate into spaces between polymer molecules spaced apart from each other of a polymer such as polystyrene. In addition, the electrolyte may be in a liquid, solid or gel phase.

The pouch 130 may have a multi-layered structure. The pouch 130 may include a metal thin film 130a and insulating layers 130b and 130c formed at respective sides of the metal thin film 130a.

The metal thin film 130a may be made of at least one selected from steel, stainless steel, aluminum and equivalents thereof. In other implementations, other materials may be used for the metal thin film 130a.

The insulating layers 130b and 130c may include a first insulating layer 130b and a second insulating layer 130c. The first insulating layer 130b may correspond to an exterior surface of the pouch 130. The first insulating layer 130b may be made of at least one selected from nylon, polyethyleneterephthalate (PET) and equivalents thereof. However, in other implementations, other materials may be used for the first insulating layer 130b.

The second insulating layer 130c may correspond to an interior surface of the pouch 130. The second insulating layer 130c may be made of at least one selected from cast polypropylene (CPP) and equivalents thereof. In other implementations, other materials may be used for the second insulating layer 130c.

In addition, the pouch 130 may generally include a first pouch portion 131 and a second pouch portion 132. The first pouch portion 131 may have a space 131a to accommodate the electrode assembly 110 and the second pouch portion 132 may cover the first pouch 131 having the space 131a. In addition, the space 131a may be formed by a pressing process.

Table 1 summarizes evaluation results with respect to the effect of suppressing deformation of the electrode assembly 110. Examples 1 to 4 were carried out with an OPS film used as the base layer while varying thicknesses of the adhesive layer. In order to evaluate the effect of suppressing deformation of the electrode assembly 110, a PP film was used as the base layer in Comparative Example 1 and a PET film was used as the base layer in Comparative Example 2. The embodiments are related to suppression of deformation in a pouch type battery having a pouch. Therefore, the term "suppression of deformation of the electrode assembly 110" in the illustrated embodiments refers to suppression of deformation of a pouch type battery. In addition, in Table 1, the term "separation distance" refers to a distance between separated portions of the adhesive layer.

In the pouch type batteries of Examples and Comparative Examples, suppression of deformation of each electrode assembly thereof is measured under the same conditions except for the conditions listed in Table 1. In each case, a pouch battery 100 was assembled with the fixing member 120, including the adhesive layer 122 and the base layer 121, disposed in one piece on the exterior surface 110b of the electrode assembly 110 and the outermost finishing part 110a of the electrode assembly 110. After the electrolyte was added to the pouch battery, the separation distance, if any, between a portion of the adhesive layer 122 on the outermost finishing part 110a and a portion of the adhesive layer 122 on the exterior surface 110b was measured and an amount of deformation, if any, to the pouch type battery was observed.

TABLE 1

| | Base layer | | Adhesive layer | Overall | Separation | Suppression |
|---|---|---|---|---|---|---|
| | Material | Thickness (μm) | Thickness (μm) | thickness (μm) | distance (mm) | of deformation |
| Example 1 | ops | 25 | 4 | 29 | 0.02 | ○ |
| Example 2 | ops | 25 | 3 | 28 | 0.05 | ○ |
| Example 3 | ops | 25 | 2 | 27 | 0.1 | ○ |
| Example 4 | ops | 25 | 1 | 26 | 0.2 | ○ |
| Comparative Example 1 | ops | 40 | 13 | 53 | 0 | X |
| Comparative Example 2 | ops | 40 | 2 | 42 | 0 | X |
| Comparative Example 3 | PP | 25 | 2 | 22 | 0 | X |
| Comparative Example 4 | PET | 25 | 2 | 22 | 0 | X |

As confirmed from Examples 1 to 4, the separation distance of the adhesive layer was reduced as the thickness of the adhesive layer increased, which is due to an increase in the adhesiveness of the fixing member. Accordingly, it was confirmed that the effect of suppressing deformation was high in Examples 1 to 4, specifically in Example 4.

In addition, as confirmed from Comparative Examples 1 and 2 in which an OPS film was used as the base layer, when the thickness of the OPS film is 40 μm, the adhesive layer is not separated from the outermost finishing part 110a of the electrode assembly 110. That is to say, if the OPS film of the base layer is formed to a thickness of 30 μm or greater, deformation of the electrode assembly 110 was not suppressed.

In Comparative Examples 3 and 4, a PP film and a PET film were used as the base layer, respectively. It was confirmed that shrinkage or melting did not occur even if the PP film and the PET film were contacted with an electrolyte, suggesting that deformation of the electrode assembly was not suppressed in Comparative Examples 3 and 4.

By way of summation and review, in the pouch type battery according to the embodiment, when the base layer of the fixing member adhered to an winding end of the electrode assembly makes contact with an electrolyte, a portion of the base layer is melted to separate the adhesive layer formed on one surface of the base layer from the one surface, thereby suppressing deformation of the electrode assembly.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A battery, comprising:
an electrode assembly having a first electrode, a second electrode and a separator between the first electrode and the second electrode, the first electrode, second electrode and separator being wound together around a central region of the electrode assembly;
an electrolyte;
a pouch accommodating the electrode assembly and the electrolyte; and
a fixing member that fixes a winding end of the electrode assembly and an external surface of the electrode assembly, the external surface being closer to the central region than the winding end, wherein:
the fixing member includes a base layer and an adhesive layer, the base layer being between the pouch and the adhesive layer, the fixing member contacting the winding end and the external surface of the electrode assembly,
a portion of the base layer in contact with the electrolyte is in a melted condition, and
the adhesive layer is separated into a first region on the winding end of the electrode assembly and a second region detached from the first region on the external surface of the electrode assembly such that the first region and the detached second region are spaced apart from each other.

2. The battery as claimed in claim 1, wherein the first region and the detached second region of the adhesive layer are separated from each other by a separation distance in a range of 0.01 mm to 0.3 mm.

3. The battery as claimed in claim 1, wherein the base layer in the melted condition adhesively contacts an interior surface of the pouch, and the base layer contacts the first region and the detached second region of the adhesive layer.

4. The battery as claimed in claim 1, wherein the fixing member has a thickness in a range of 10 μm to 35 μm.

5. The battery as claimed in claim 4, wherein the adhesive layer has a thickness of 2 to 16% of the overall thickness of the fixing member.

6. The battery as claimed in claim 1, wherein the adhesive layer has a thickness in a range of 1 μm to 4 μm.

7. The battery as claimed in claim 1, wherein the base layer includes a material selected from polystyrene, oriented polystyrene, polyamide, polyacrylonitrile, polyvinyl alcohol, polycarbonate, and polyethylene vinylacetate.

8. The battery as claimed in claim 7, wherein the base layer is an oriented polystyrene (OPS) film.

9. The battery as claimed in claim 8, wherein the electrolyte includes a carbonate-based solvent.

10. The battery as claimed in claim 9, wherein the carbonate solvent is at least one selected from dimethyl carbonate (DMC), diethyl carbonate (DEC) and dipropyl carbonate (DPC).

11. The battery as claimed in claim 1, wherein the fixing member surrounds an overall outermost surface of the electrode assembly.

12. The battery as claimed in claim 1, wherein the pouch includes a first pouch portion and a second pouch portion to accommodate the electrode assembly, adhering portions formed by adhering opposing edges of the first pouch portion and the second pouch portion, and a planar part connecting the opposing adhering portions.

13. The battery as claimed in claim 1, wherein the pouch has a multilayered thin film structure including a metal layer that is a thin film, a first insulating layer covering one surface of the metal layer, and a second insulating layer covering another surface of the metal layer, opposite to the one surface of the metal layer.

14. A battery, comprising:
an electrode assembly having a first electrode, a second electrode, and a separator between the first electrode and the second electrode, the first electrode, second electrode and separator being wound together around a central region of the electrode assembly, and the electrode assembly including:
an outermost finishing part including a winding end of the electrode assembly, and
an exterior surface adjacent to the winding end, the external surface being closer to the central region than the winding end;
a pouch accommodating the electrode assembly; and
a fixing member on the outermost finishing part and the exterior surface between the electrode assembly and the pouch, the fixing member including a base layer and an adhesive layer,
the base layer having a thickness in a range of about 10 to about 35 μm and including a material selected from polystyrene, oriented polystyrene, polyamide, polyacrylonitrile, polyvinyl alcohol, polycarbonate, and polyethylene vinylacetate, and
the adhesive layer being separated into a first region on the winding end of the electrode assembly and a second region detached from the first region on the external surface of the electrode assembly such that the first region and the detached second region are spaced apart from each other, the adhesive layer having a thickness of 2 to 16% of an overall thickness of the fixing member.

15. The battery as claimed in claim 14, further including an electrolyte, wherein:
a portion of the base layer in contact with the electrolyte is in a melted condition and adhesively contacts an interior side of the pouch, the portion of the base layer being on the winding end and the external surface of the electrode assembly, and
the first region and the detached second region of the adhesive layer are spaced apart by a separation distance in a range of 0.01 mm to 0.3 mm.

16. The battery as claimed in claim 1, wherein the portion of the base layer in contact with the electrolyte in the melted condition includes a first base layer on the first region of the adhesive layer and a second base layer on the detached second region of the adhesive layer.

17. The battery as claimed in claim 16, wherein:
the first base layer and the second base layer are each in contact with the pouch, and
the first base layer and the second base layer are each a polymer film, which polymer film in the melted condition includes the electrolyte embedded between polymer molecules of the polymer film.

18. The battery as claimed in claim 17, wherein the first region and the detached second region of the adhesive layer are separated from each other by a separation distance, the separation distance extending along a winding direction of the electrode assembly.

* * * * *